(12) United States Patent
Larson et al.

(10) Patent No.: US 10,510,034 B2
(45) Date of Patent: Dec. 17, 2019

(54) INVESTIGATOR INTERFACE AND OVERRIDE FUNCTIONALITY WITHIN COMPLIANCE DETERMINATION AND ENFORCEMENT PLATFORM

(71) Applicant: Coinbase, Inc., San Francisco, CA (US)

(72) Inventors: Bradley J. Larson, San Francisco, CA (US); Linda Xie, Pleasanton, CA (US); Paul Jabaay, Grand Rapids, MI (US); Jeffrey B. Kern, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 455 days.

(21) Appl. No.: 15/272,212

(22) Filed: Sep. 21, 2016

(65) Prior Publication Data

US 2018/0082235 A1    Mar. 22, 2018

(51) Int. Cl.
*G06Q 40/00* (2012.01)
*G06Q 40/02* (2012.01)
*G06Q 20/02* (2012.01)
*G06Q 10/06* (2012.01)

(52) U.S. Cl.
CPC ..... *G06Q 10/06393* (2013.01); *G06Q 10/067* (2013.01)

(58) Field of Classification Search
CPC ........ G06Q 40/00; G06Q 40/02; G06Q 20/02; G06Q 20/045
USPC .......................................................... 705/35
See application file for complete search history.

(56) References Cited

U.S. PATENT DOCUMENTS

| | | | |
|---|---|---|---|
| 8,306,937 B2 | 11/2012 | Otto et al. | |
| 8,812,342 B2* | 8/2014 | Barcelo ................. | G06F 21/552 705/7.28 |
| 2003/0182206 A1 | 9/2003 | Hendrix et al. | |
| 2008/0288330 A1 | 11/2008 | Hildebrand et al. | |
| 2009/0292632 A1 | 11/2009 | Dheer et al. | |
| 2010/0114634 A1 | 5/2010 | Christiansen et al. | |
| 2010/0324952 A1 | 12/2010 | Bastos et al. | |
| 2014/0156473 A1 | 6/2014 | Murphy | |
| 2015/0112744 A1* | 4/2015 | Neuweg ............. | G06Q 10/0637 705/7.14 |

* cited by examiner

*Primary Examiner* — Hai Tran
(74) *Attorney, Agent, or Firm* — Jeffrey Schox; Diana Lin

(57) ABSTRACT

A compliance determination and enforcement platform is described. A plurality of factors are stored in association with each of a plurality of accounts. A factor entering module enters factors from each user account into a compliance score model. The compliance score model determines a compliance score for each one of the accounts based on the respective factors associated with the respective account. A comparator compares the compliance score for each account with a compliance reference score to determine a subset of the accounts that fail compliance and a subset of the accounts that meet compliance. A flagging unit flags the user accounts that fail compliance to indicate non-compliant accounts. A corrective action system allows for determining, for each one of the accounts that is flagged as non-compliant, whether the account is bad or good, entering the determination into a feedback system and closing the account.

17 Claims, 13 Drawing Sheets

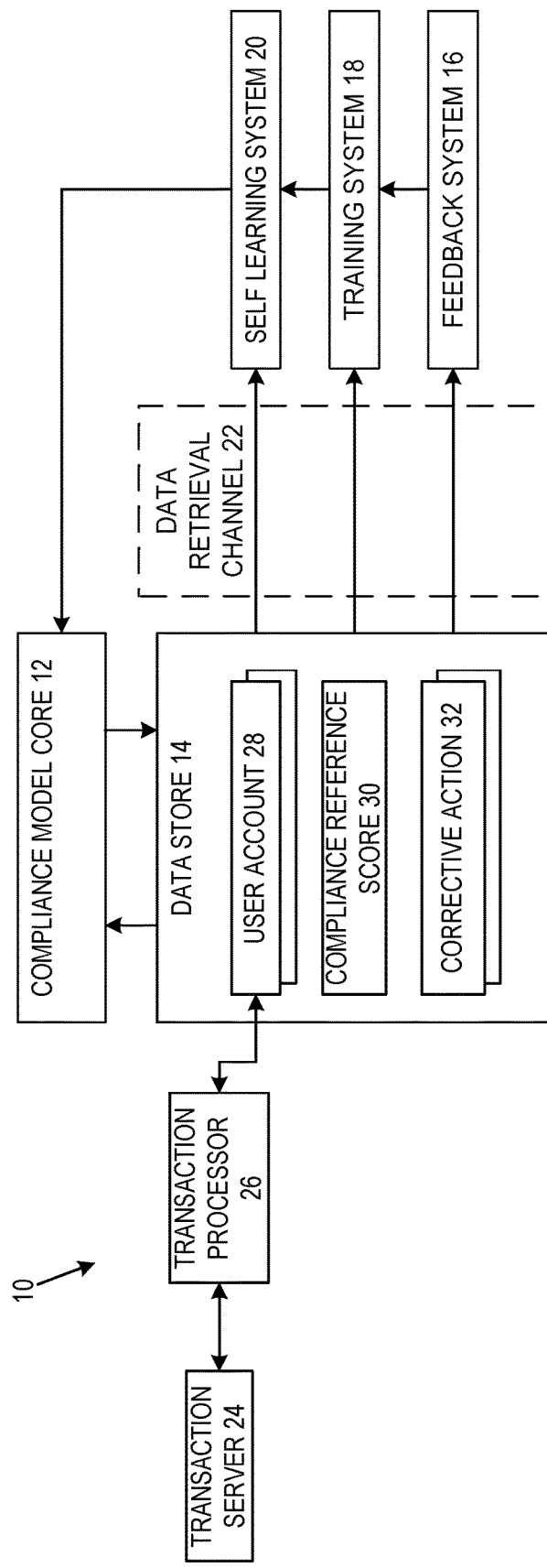
FIG. 1
FIG. 2A
INITIAL TRAINING
FIG. 2B
CONTINUED OPERATION

| Actions | Triggered | Reason | User | Balance | External Volume | Last Transaction | Score |
|---|---|---|---|---|---|---|---|
| Clear<br>More Actions ▼ | 2016-04-28 5:57 PM | High compliance score (0.91786400) | Ben {benpots@gmail.com} | 0.0000 BTC | | 2016-04-05 1125 PM | 0.917864 |
| state_fl: 0.16265600<br>users_nth_transaction_bkt_0_to_50: 0.20154400<br>num_addresses_onfile_2: 0.20628600<br>lifetime_sefl_volume_zero: 0.22001300<br>approvedievel_requestfalse: 0.22001300 | | | | | num_devices_bkt_a_to_10: 0.23206900<br>lifetime_receive_volume_zera: 0.26030000<br>rejectedlevel_requestfalse: 0.29280700<br>approved_eddlevel: 0.32331200<br>coinbase_btc_balance_zercr 1.00178000 | | |
| Clear<br>More Actions ▼ | 2016-04-28 5:57 PM | High compliance score (0.91778400) | | 0.00007813 BTC | 50.00 USD | 2015-11-05 12:05 AM | 0.917784 |
| Clear<br>More Actions ▼ | 2016-04-28 5:57 PM | High compliance score (0.91699200) | Alex Smith (as7566n@yogo.com) | | 51,025.95 USD | 2015-11-20 1125 AM | 0.915992 |
| completed_successful_purchase_true: 0.15806700<br>users_nth_transaction_bkt_0_to_50: 0.19986800<br>approvedieveLrequestfalse: 0.22001300<br>usecitor true: 0.26858100<br>rejectedievel_requestialse: 0.29280700 | | | Alex Smith (as7566n@yogo.com)<br>Created: 2015-10-11 7:21 PM<br>Balance: 0.00007813 BTC<br>Digital Footprint: 32<br>Country:<br>Identity Verification:<br>Jumio Completed:<br>Phone Provider:<br>Cluster Size: 1 | | oved_eddialse: 0.32331200<br>0324: 0.36753200<br>georgetown: 0.41053700<br>21: 0.62010400<br>coinbase_btc_balance_zero: 1.00178000 | | |

FIG. 4A

| Actions | Triggered | Reason | User | Balance | External Volume | Last Transaction | Score |
|---|---|---|---|---|---|---|---|
| Clear<br>More Actions ▼ | 2016-04-28 5:57 PM | High compliance score (0.91786400)<br>state_fl: 0.16265600<br>users_nth_transaction_bkt_0_to_50: 0.19986800<br>num_addresses_onfile_2: 0.20154400<br>lifetime_sefl_volume_zero: 0.20628600<br>approvedlevel_requestfalse: 0.22001300 | Ben {benpots@gmail.com) | 0.0000 BTC | | 2016-04-05 1125 PM | 0.917864 |
| Clear<br>More Actions ▼<br>Clear<br>More Actions ▼ | 2016-04-28 5:57 PM<br>2016-04-28 5:57 PM | High compliance score (0.91778400)<br>High compliance score (0.91699200)<br>chase_true: 0.15806700<br>0_to_50: 0.19986800<br>: 0.22001300<br>: 0.29280700 | Alex Smith<br>(as7566n@yogo.com) | 0.00007813 ETC<br>0.0000 BTC | 50.00 USD<br>51,025.95 USD | 2015-11-05 12:05 AM<br>2015-11-20 1125 AM | 0.917784<br>0.915992 | num_devices_bkt_a_to_10: 0.23206900
lifetime_receive_volume_zera: 0.26030000
rejectedlevel_requestfalse: 0.29280700
approved_eddfalser 0.32331200
coinbase_btc_balance_zercr 1.00178000 approved_eddialse: 0.32331200
zip_40324: 0.36753200
city_georgetown: 0.41053700
age_21: 0.62010400
coinbase_btc_balance_zero: 1.00178000

Violated Gambling Policy
Violated LocalBitcoins Policy
Violated Merchant Policy
Confirm Business User
Initiate EDD
Schedule Follow Up
Edit Levels
Edit Admin Flags
Leave A Comment Show Event History
Other Pending Reviews Mark as NOT useful

FIG. 4B

INVESTIGATOR INTERFACE AND OVERRIDE FUNCTIONALITY WITHIN COMPLIANCE DETERMINATION AND ENFORCEMENT PLATFORM

BACKGROUND OF THE INVENTION

1. Field of the Invention

This invention relates to a compliance determination and enforcement platform and method.

2. Discussion of Related Art

Internet users frequently make use of intermediate transaction processors for purposes of making payments to other users or receiving payments from other users. A transaction processor may have a data store where a user can open a user account. A transaction that is processed with a transaction processor is recorded as a debit or a credit in the paying and/or receiving user account.

Many users use their accounts for conducting legal activities, such as paying for real or virtual goods or services. Other users may use their accounts for money laundering purposes or conducting other illicit activities. An investigator may be able to determine whether an account is being used for illicit activities by doing research on the parties of the transaction who receive or send payment and determining whether such parties are regularly involved in illicit activities. It may for example be relatively easy to determine that a party sending or receiving payment is in the business of conducting online services that may be illegal. In other cases, for example, where illegal goods or services are being exchanged outside of the Internet, it may not be practical or possible for an investigator to determine that the parties are using their accounts for illegal activities.

SUMMARY OF THE INVENTION

The invention provides a compliance determination and enforcement platform including a processor, a computer-readable medium connected to the processor and a set of computer readable code on the computer-readable medium. The set of computer readable code includes a data store, a plurality of user accounts stored in the data store, a transaction processor that is executable by the processor to process transactions for the respective user accounts, a compliance reference score stored in the data store, a plurality of factors stored in association with each account, a compliance score model, a factor entering module that is executable by the processor to enter at least one factor from each user account into a compliance score model, wherein the compliance score model is executable by the processor to determine a compliance score for each one of the accounts, wherein the respective compliance score for the respective account is based on the respective factor associated with the respective account, a comparator that is executable by the processor to compare the compliance score for each account with the compliance reference score to determine a subset of the accounts that fail compliance and a subset of the accounts that meet compliance, a flagging unit that is executable by the processor to flag the user accounts that fail compliance to indicate non-compliant accounts and a corrective action system that is executable by the processor to perform a corrective action only for the accounts that are flagged as non-compliant accounts.

The compliance determination and enforcement platform may further include that at least one of the factors entered into the compliance score model is an age of a user of the respective account.

The compliance determination and enforcement platform may further include that at least one of the factors entered into the compliance score model is a level of due diligence that has been performed on the respective account.

The compliance determination and enforcement platform may further include that at least one of the factors entered into the compliance score model is a balance of the respective account.

The compliance determination and enforcement platform may further include that at least one of the factors entered into the compliance score model is a volume of transactions of the respective account.

The compliance determination and enforcement platform may further include that at least one of the factors entered into the compliance score model is a geographical location of a user of the respective account.

The compliance determination and enforcement platform may further include that at least one of the factors entered into the compliance score model is a number of devices used to access the respective account.

The compliance determination and enforcement platform may further include that at least one of the factors entered into the compliance score model is one or more previous compliance reviews of the respective user account.

The compliance determination and enforcement platform may further include that at least one of the factors entered into the compliance score model is a based on if and how a user of the respective account has verified their identity.

The compliance determination and enforcement platform may further include that at least one of the factors entered into the compliance score model is based on the transaction for the largest amount among the transactions of the respective account.

The compliance determination and enforcement platform may further include that at least one of the factors entered into the compliance score model is based on how many changes have been made to personal details of the respective account.

The compliance determination and enforcement platform may further include that the corrective action system allows for determining, for each one of the accounts that is flagged as non-compliant, whether the account is bad or good. If the account is bad, then entering the determination that the account is bad into a feedback system and closing the account and if the account is good, then entering the determination that the account is good into a feedback system without closing the account.

The compliance determination and enforcement platform may further include that the corrective action system allows for determining, whether a transaction in the account is for more than a predetermined reporting amount and only if the transaction is for more than the predetermined reporting amount, then filing a report.

The compliance determination and enforcement platform may further include a training set selector operable to select a training set of the user accounts, the training set being a subset of the user accounts, a training set flagging module operable to flag select ones of the user accounts in the training set that fail compliance to indicate non-compliant accounts to determine at least one fail parameter of the con-compliant accounts in the training set, reference data established based on the fail parameters, wherein the compliance score is based on the reference data.

The compliance determination and enforcement platform may further include that the training set flagging module is operable determining a plurality of fail parameters of the con-compliant accounts in the training set, wherein the reference data is established based on the plurality of fail parameters.

The compliance determination and enforcement platform may further include that the compliance score model is executable by the processor to determine a compliance score for each one of the accounts other than the accounts of the training set, wherein the respective compliance score for the respective account is based on the respective factor associated with the respective account, wherein the respective compliance score is based on the reference data.

The compliance determination and enforcement platform may further include that a plurality of factors from each account are entered into the compliance score model and the respective compliance score for the respective account is based on the respective plurality of factors associated with the respective account.

The compliance determination and enforcement platform may further include a corrective action storing unit storing the corrective action in the data store, a model modifier, a corrective action transfer unit entering the corrective action into the model modifier, wherein the model modifier is executable by the processor to modify the compliance score model based on the corrective action.

The compliance determination and enforcement platform may further include that, after the compliance score module is modified, the transaction processor is executable by the processor to process transactions for the respective user accounts, the factor entering module is executable by the processor to enter at least one factor from each user account into a compliance score model, the compliance score model is executable by the processor to determine a compliance score for each one of the accounts, wherein the respective compliance score for the respective account is based on the respective factor associated with the respective account, wherein the compliance score module calculates a different compliance score for a select account before the compliance score module is modified than after the compliance score module is modified, the comparator is executable by the processor to compare the compliance score for each account with the compliance reference score to determine a subset of the accounts that fail compliance and a subset of the accounts that meet compliance, the flagging unit that is executable by the processor to flag the user accounts that fail compliance to indicate non-compliant accounts and the corrective action system that is executable by the processor to perform a corrective action only for the accounts that are flagged as non-compliant accounts.

The compliance determination and enforcement platform may further include a self learning knowledge repository, data stored in the self learning knowledge repository, a self learning data entering module entering the data from the self learning knowledge repository in the compliance score model, wherein the compliance score module calculates a compliance score for a select account based on the data from the self learning knowledge repository, a self learning knowledge update module updating the data in the self learning knowledge repository, wherein the self learning data entering module enters the data from the self learning knowledge repository in the compliance score model after the data in the self learning knowledge repository is updated, wherein the compliance score module calculates a different compliance score for a select account before the data in a self learning knowledge repository is updated than after the data in a self learning knowledge repository is updated.

The compliance determination and enforcement platform may further include that, after the compliance score module is modified, the transaction processor is executable by the processor to process transactions for the respective user accounts, the factor entering module is executable by the processor to enter at least one factor from each user account into a compliance score model, the compliance score model is executable by the processor to determine a compliance score for each one of the accounts, wherein the respective compliance score for the respective account is based on the respective factor associated with the respective account, wherein the compliance score module calculates a different compliance score for a select account before the compliance score module is modified than after the compliance score module is modified, the comparator is executable by the processor to compare the compliance score for each account with the compliance reference score to determine a subset of the accounts that fail compliance and a subset of the accounts that meet compliance, the flagging unit that is executable by the processor to flag the user accounts that fail compliance to indicate non-compliant accounts and the corrective action system that is executable by the processor to perform a corrective action only for the accounts that are flagged as non-compliant accounts.

The invention also provides a compliance determination and enforcement method including storing, by a processor, a plurality of user accounts in a data store, processing, by the processor, transactions for the respective user accounts, storing, by a processor, a compliance reference score in the data store, storing, by the processor, a plurality of factors in association with each account, entering, by the processor, at least one factor from each user account into a compliance score model, executing, by the processor, the compliance score model to determine a compliance score for each one of the accounts, wherein the respective compliance score for the respective account is based on the respective factor associated with the respective account, comparing, by the processor, the compliance score for each account with the compliance reference score to determine a subset of the accounts that fail compliance and a subset of the accounts that meet compliance, flagging, by the processor, the user accounts that fail compliance to indicate non-compliant accounts, executing, by the processor, a corrective action only for the accounts that are flagged as non-compliant accounts.

The compliance determination and enforcement method may further include that at least one of the factors entered into the compliance score model is an age of a user of the respective account.

The compliance determination and enforcement method may further include that at least one of the factors entered into the compliance score model is a level of due diligence that has been performed on the respective account.

The compliance determination and enforcement method may further include that at least one of the factors entered into the compliance score model is a balance of the respective account.

The compliance determination and enforcement method may further include that at least one of the factors entered into the compliance score model is a volume of transactions of the respective account.

The compliance determination and enforcement method may further include that at least one of the factors entered into the compliance score model is a geographical location of a user of the respective account.

The compliance determination and enforcement method may further include that at least one of the factors entered into the compliance score model is a number of devices used to access the respective account.

The compliance determination and enforcement method may further include that at least one of the factors entered into the compliance score model is one or more previous compliance reviews of the respective user account.

The compliance determination and enforcement method may further include that at least one of the factors entered into the compliance score model is a based on if and how a user of the respective account has verified their identity.

The compliance determination and enforcement method may further include that at least one of the factors entered into the compliance score model is based on the transaction for the largest amount among the transactions of the respective account.

The compliance determination and enforcement method may further include that at least one of the factors entered into the compliance score model is based on how many changes have been made to personal details of the respective account.

The compliance determination and enforcement method may further include determining, for each one of the accounts that is flagged as non-compliant, whether the account is bad or good. If the account is bad, then entering the determination that the account is bad into a feedback system and closing the account, and if the account is good, then entering the determination that the account is good into a feedback system without closing the account.

The compliance determination and enforcement method may further include determining, whether a transaction in the account is for more than a predetermined reporting amount, and only if the transaction is for more that the predetermined reporting amount, then filing a report.

The compliance determination and enforcement method may further include selecting a training set of the user accounts, the training set being a subset of the user accounts, flagging select ones of the user accounts in the training set that fail compliance to indicate non-compliant accounts, determining at least one fail parameter of the con-compliant accounts in the training set and establishing reference data based on the fail parameters, wherein the compliance score is based on the reference data.

The compliance determination and enforcement method may further include determining a plurality of fail parameters of the con-compliant accounts in the training set and establishing reference data based on the plurality of fail parameters.

The compliance determination and enforcement method may further include executing, by the processor, the compliance score model to determine a compliance score for each one of the accounts other than the accounts of the training set, wherein the respective compliance score for the respective account is based on the respective factor associated with the respective account, wherein the respective compliance score is based on the reference data.

The compliance determination and enforcement method may further include that a plurality of factors from each account are entered into the compliance score model and the respective compliance score for the respective account is based on the respective plurality of factors associated with the respective account.

The compliance determination and enforcement method may further include storing, by the processor, the corrective action in the data store, entering, by the processor, the corrective action into a model modifier and executing, by the processor, the model modifier to modify the compliance score model based on the corrective action.

The compliance determination and enforcement method may further include that, after the compliance score module is modified, processing, by the processor, transactions for the respective user accounts after the compliance score module is modified, entering, by the processor, at least one factor from each user account into a compliance score model, executing, by the processor, the compliance score model to determine a compliance score for each one of the accounts, wherein the respective compliance score for the respective account is based on the respective factor associated with the respective account, wherein the compliance score module calculates a different compliance score for a select account before the compliance score module is modified than after the compliance score module is modified, comparing, by the processor, the compliance score for each account with the compliance reference score to determine a subset of the accounts that fail compliance and a subset of the accounts that meet compliance, flagging, by the processor, the user accounts that fail compliance to indicate non-compliant accounts and executing, by the processor, a corrective action only for the accounts that are flagged as non-compliant accounts.

The compliance determination and enforcement method may further include storing, by the processor, data in a self learning knowledge repository, entering, by the processor, the data from the self learning knowledge repository in the compliance score model, wherein compliance score module calculates a compliance score for a select account based on data from self learning knowledge repository, updating, by the processor, the data in self learning knowledge repository, and entering, by the processor, the data from self learning knowledge repository in the compliance score model after the data in the self learning knowledge repository is updated, wherein the compliance score module calculates a different compliance score for a select account before the data in a self learning knowledge repository is updated than after the data in a self learning knowledge repository is updated.

The compliance determination and enforcement method may further include that, after the compliance score module is modified, processing, by the processor, transactions for the respective user accounts after the compliance score module is modified, entering, by the processor, at least one factor from each user account into a compliance score model, executing, by the processor, the compliance score model to determine a compliance score for each one of the accounts, wherein the respective compliance score for the respective account is based on the respective factor associated with the respective account, wherein the compliance score module calculates a different compliance score for a select account before the compliance score module is modified than after the compliance score module is modified, comparing, by the processor, the compliance score for each account with the compliance reference score to determine a subset of the accounts that fail compliance and a subset of the accounts that meet compliance, flagging, by the processor, the user accounts that fail compliance to indicate non-compliant accounts and executing, by the processor, a corrective action only for the accounts that are flagged as non-compliant accounts.

BRIEF DESCRIPTION OF THE DRAWINGS

The invention is further described by way of example with reference to the accompanying drawings, wherein:

FIG. 1 is a block diagram of a compliance determination and enforcement platform according to an embodiment of the invention;

FIGS. 2A and 2B show systems of the compliance determination and enforcement platform during initial training and continued operation, respectively;

FIGS. 4A and 4B show a user interface that is provided by a corrective action system of the compliance determination and enforcement platform;

DETAILED DESCRIPTION OF THE INVENTION

Figure 3:
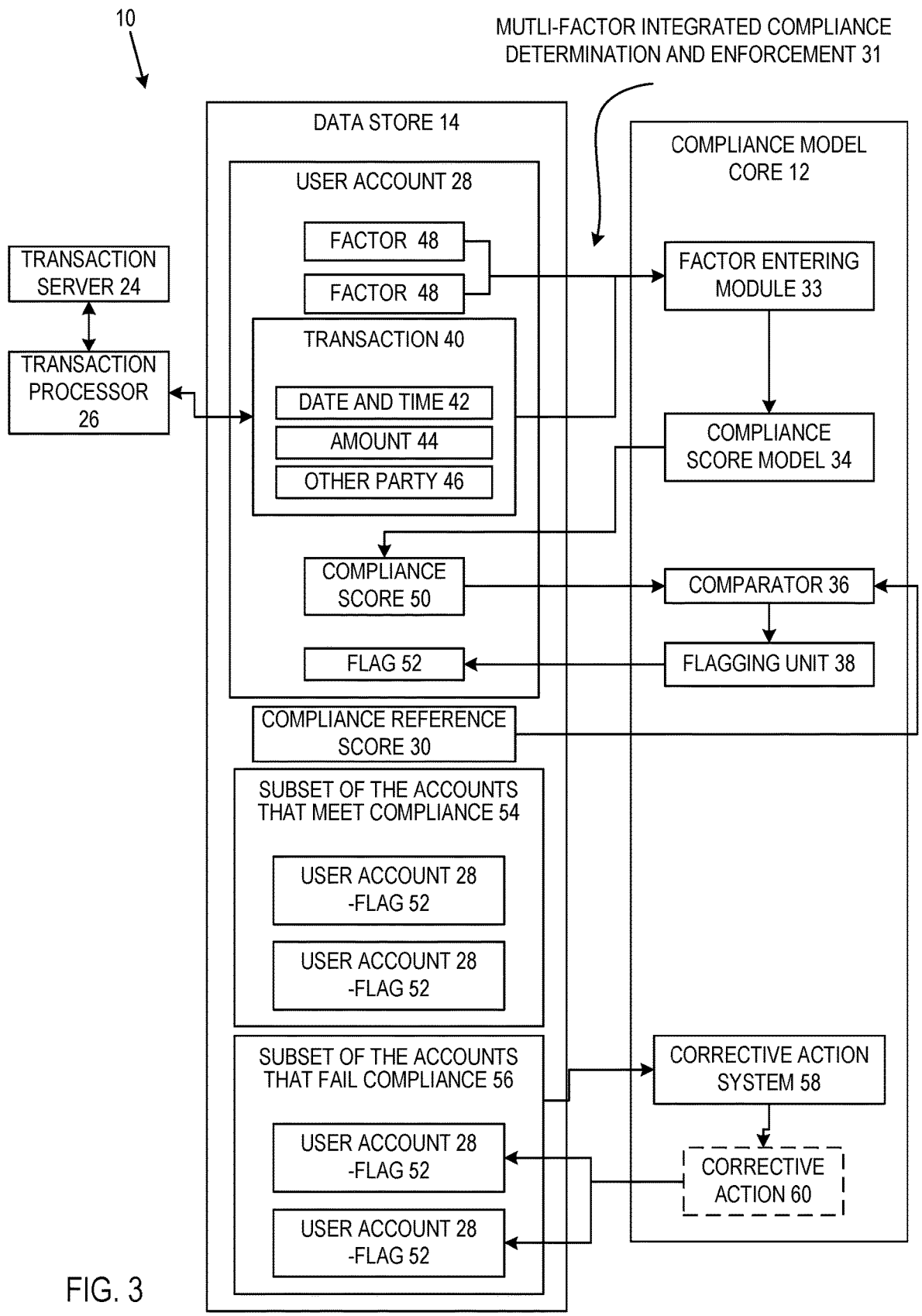
FIG. 3 is a block diagram of the compliance determination and enforcement platform illustrating multi-factor integrated compliance determination and enforcement and investigator interface and override functionality.

FIG. 1 of the accompanying drawings illustrates a compliance determination and enforcement platform 10, according to an embodiment of the invention, including a compliance model core 12, a data store 14, a feedback system 16, a training system 18, a self learning system 20, a data retrieval channel 22, a transaction server 24, and a transaction processor 26.

The data store 14 includes user accounts 28, a compliance reference score 30, and corrective actions 32.

The transaction server 24 is connected through the transaction processor 26 to the user accounts 28 in the data store 14. The transaction processor 26 is executable to process transactions for the respective user accounts 28. The transaction processor 26 receives transactions from the transaction server 24 and enters the transactions into the user accounts 28. A transaction can be a debit or a credit transaction and include other information such as a time and date stamp.

The compliance model core 12 receives data from the data store 14 and provides data to the data store 14. The purpose of the compliance model core 12 is to flag select ones of the user accounts 28 as non-compliant accounts and to provide an interface for investigators to take further corrective action.

The feedback system 16, training system 18, and self learning system 20 are connected through the data retrieval channel 22 to the data store 14. As shown in FIG. 2A, during initial training, the training system 18 is executed. The training system 18 functions to train the compliance model core 12. The training system 18 receives data over the data retrieval channel 22 from the data store 14. The feedback system 16 and the self learning system 20 are not executed during initial training.

As shown in FIG. 2B, during continued operation, the feedback system 16, training system 18 and self learning system 20 are executed, typically in sequence after one another. All three systems 16, 18 and 20 receive data over the data retrieval channel 22 from the data store 14. The feedback system 16 provides input into the training system 18. The training system 18 then provides input into the self learning system 20. The self leaning system 20 provides input into the compliance model core 12 for purposes of making adjustments to the compliance model core 12 where necessary.

In FIG. 2A, the training system 18 uses a training data set of the user accounts 28 that does not include all the user accounts 28. In FIG. 2B, the training system 18 receives data from all the user accounts 28.

FIG. 3 shows aspects of the compliance determination and enforcement platform 10 as they relate to multi-factor integrated compliance determination and enforcement 31. The compliance model core 12 includes a factor entering module 33, a compliance score model 34, a comparator 36, and a flagging unit 38.

The user account 28 includes multiple transactions, including a transaction 40. The transaction 40 includes a number of factors, including date and time 42, an amount 44, the other party in the transaction 46, etc. The user account 28 further includes other factors 48. The factor entering module 33 is a multi-factor entering module that enters a plurality of the factors 48 in the user account 28 and factors from the transaction 40. The factors that are received and entered by the factor entering module 33 include, without limitation:

An age of a user of the user account 28;
A level of due diligence that has been performed on the user account 28;
a balance of the user account 28;
recent volume of transactions of the user account 28 (buy, sell, send, receive);
lifetime volume;
a geographical location of a user of the user account 28;
one or more previous compliance reviews of the user account 28;
if and how a user of the user account 28 has verified their identity;
account created date;
email domain;
whether the account was restricted by fraud;
the highest balance to date?
whether the user is a merchant;
business type;
number of addresses on file;
number of bitcoin addresses transacted with;
number of bank accounts;
number of IPs;
number of phone numbers;
number of queues flagged in;
number of reviews by compliance;
number of unique counterparties;
number of verification attempts.

The factor entering module 33 is executable to enter the factors from each user account 28 into the compliance score model 34. The compliance score model 34 is executable to determine a compliance score for each one of the user accounts 28, with the respective compliance score for the respective user account 28 being based on the plurality of factors entered by the factor entering module 33. The compliance score model 34 stores the compliance score for the user account 28 as a compliance score 50 in relation to the user account 28.

The comparator 36 compares the compliance score 50 with the compliance reference score 30. By way of example, the comparator 36 determines whether the compliance score 50 is more than the compliance reference score 30 to determine whether the respective user account 28 should fail compliance, or should pass compliance if the compliance score 50 is equal to or less than the compliance reference score 30. The comparator 36 then provides the result of the whether the respective user account 28 fails or passes compliance to the flagging unit 38. The flagging unit 38 then flags the respective user account 28 with a flag 52 indicating that the respective user account 28 either fails compliance or passes compliance. An account that fails compliance indicates that the account is a non-compliant account. A non-compliant account may be an account that is suspected of being used for money laundering or other illicit activities.

After each one of the user accounts 28 has been flagged as either compliant or non-compliant, the user accounts 28 can be divided into a subset of accounts that meet compliance 54 and a subset of the accounts that fail compliance 56.

The compliance model core 12 further includes a corrective action system 58. The corrective action system 58 takes further corrective action with respect to the subset of the accounts that fail compliance 56. The corrective action system 58 includes components that are automatically executed and investigator-interactive user interfaces that allow for investigators to further analyze the accounts. The corrective action system 58 is then used to take corrective action 60, where necessary, with respect to the user accounts 28 that are in the subset of user accounts that fail compliance 56. The corrective action 60 may for example be to close a user account 28 and to potentially file a report.

FIG. 4A shows an interface that is displayed to an investigator. The interface includes entries for a plurality of users. The compliance score for each user is indicated in the right hand column. The investigator has moused over the name of the second user, which allows the investigator view further information of the user account.

FIG. 4B shows the interface after the investigator has selected the link "More Actions" of one of the accounts. A drop-down list is displayed where the investigator selects an action item that is then stored in association with the account. The action items that are stored are then used by the same investigator, another attendee or by computer-programmed code to execute further actions. Such further actions are displayed in the text of the drop-down list and may also include closing of the account. The action items that are stored are also used by the feedback system 16 to further improve the compliance model core 12 (see FIG. 1). The action items may for example serve to validate/enhance the data that was used to flag the account. One of the action items indicates that the account was incorrectly flagged ("Mark as NOT useful"), which indicates that the account is compliant and provides feedback to the system to indicate to the system that the system make modifications in the way that the accounts are scored so that the account is not flagged with a high compliance score in the future, and other accounts are also not flagged with high compliance scores for similar factors or combinations of factors as the account that has been marked as being compliant.

Figure 5:
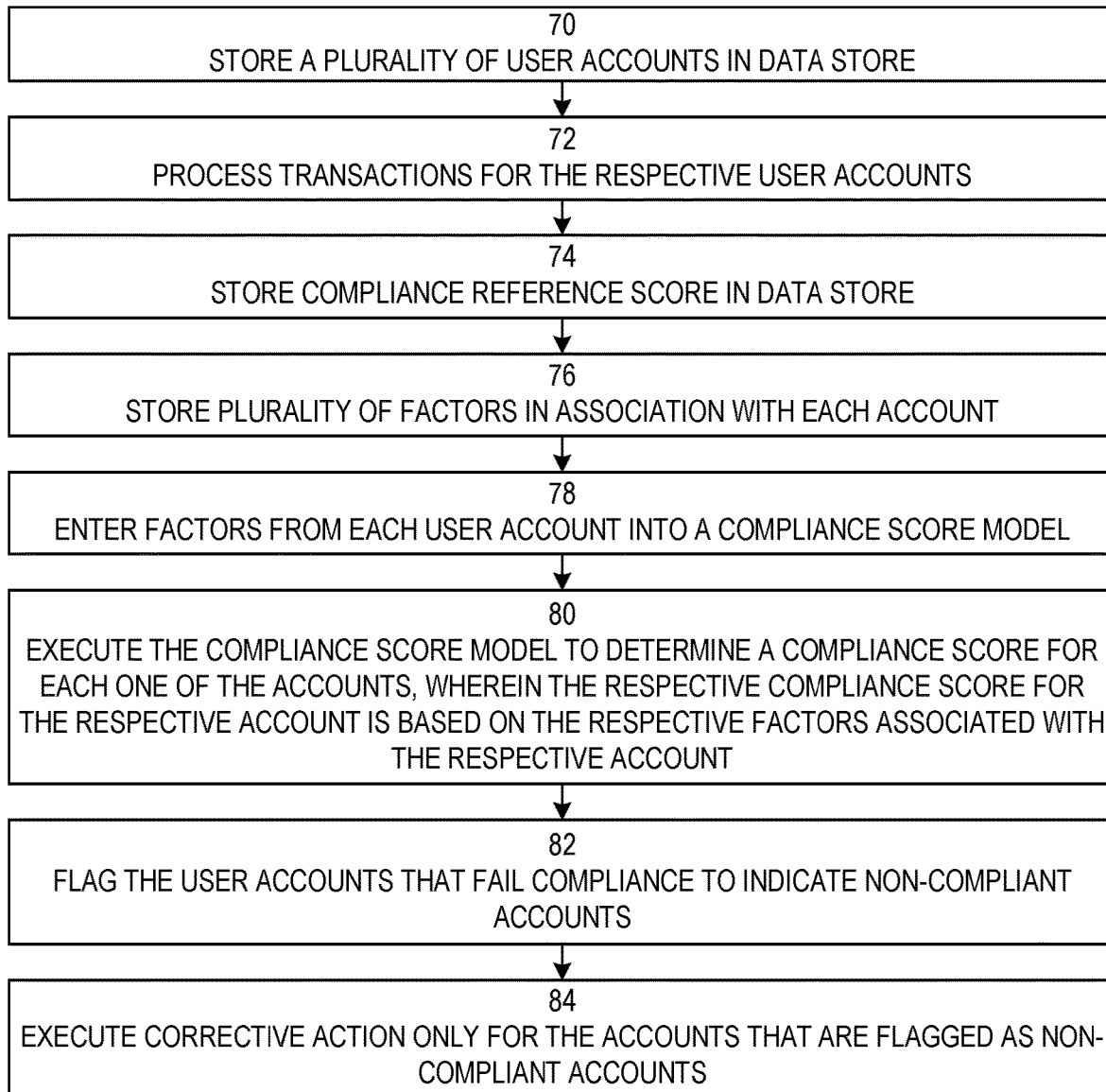
FIG. 5 is a flow chart illustrating a compliance determination and enforcement method.

FIG. 5 illustrates a compliance determination and enforcement method as hereinbefore described. At 70, a plurality of user accounts are stored in a data store. At 72, transactions are processed for the respective user accounts. At 74, a compliance reference score is stored in the data store. At 76, a plurality of factors are stored in association with each account. At 78, the factors from each user account are entered into a compliance score model. At 80, the compliance score model is executed to determine a compliance score for each one of the accounts. The respective compliance score for the respective account is based on a respective factors associated with the respective account. At 82, the user accounts that fail compliance are flagged to indicate non-compliant accounts. At 84, corrective action is executed only for the accounts that are flagged as non-compliant accounts.

Figure 6:
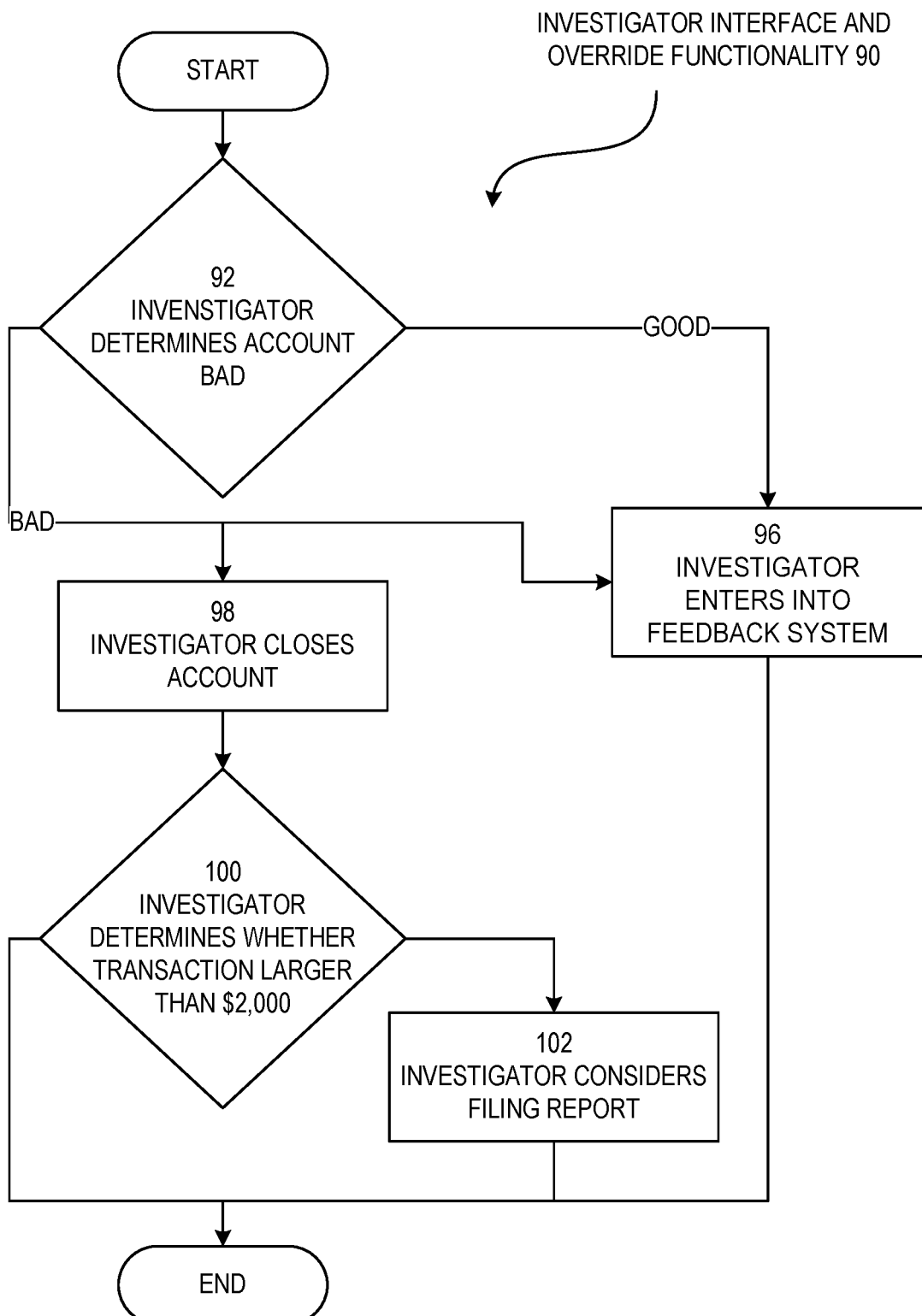
FIG. 6 is a flow chart illustrating investigator interface and override functionality of the compliance determination and enforcement method.

FIG. 6 illustrates investigator interface and override functionality 90 in more detail. At 92, an investigator determines whether an account is bad using the interface shown in FIG. 4. At 96, the investigator enters the determination into the feedback system 16 shown in FIG. 1. The investigator enters the determination into the feedback system 16 irrespective of whether the account has been determined as being bad or good.

If the investigator has determined that the account is good, then the process ends after 96.

If the investigator determines that the account is bad, then, at 98, the investigator closes the account or marks the account for more actions as described with reference to FIG. 4B. Following 98, at 100, the investigator also determines whether the transaction that has resulted in non-compliance is larger than $2000 USD (a predetermined amount). If the transaction is larger than $2000 USD, the investigator, at 102, considers filing a report with the relevant authorities. If the transaction is less than $2000 USD, then the process ends without the investigator filing a report.

Figure 7A:
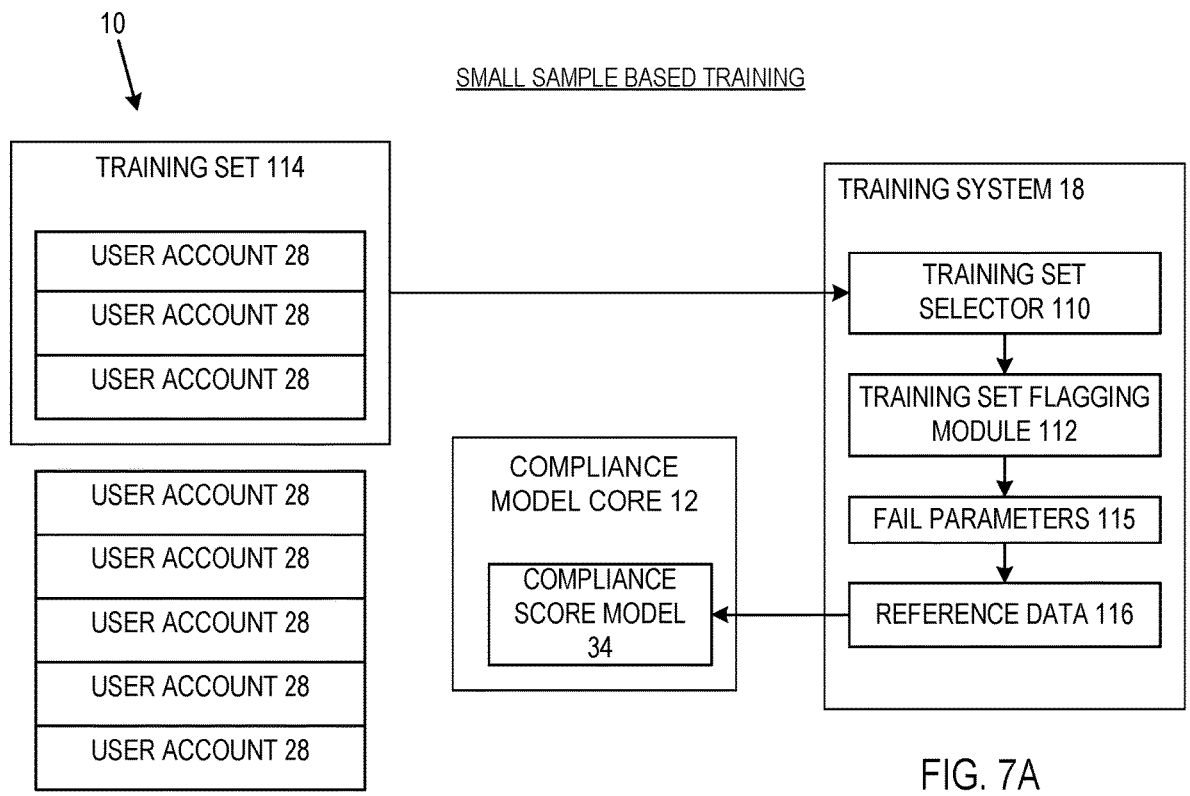
FIGS. 7A and 7B are block diagrams illustrating small sample based training and large population application of a training system that is used in the compliance determination and enforcement platform.

FIG. 7A illustrates small sample based training using the training system 18 in FIG. 1. The training system 18 includes a training set selector 110 and a training set flagging module 112. The training set selector 110 selects a training set 114 of the user accounts 28. The training set 114 is a smaller sample of user accounts 28 than all of the user accounts 28 and is used for initial training of the compliance score model 34. By way of example, the training set selector 110 may be used to select a training set 114 of 5 percent or less of all the user accounts 28. The training set selector 110 may be executed entirely automatically, or may include an interface for an operator to select the user accounts 28 that form part of the training set 114.

The training set flagging module 112 flags selected ones of the user accounts 28 of the training set 114 that fail compliance. In this manner, the user accounts 28 of the training set 114 are identified as accounts that meet compliance standards or accounts that fail compliance standards. The training set flagging module 112 may be executed entirely automatically or an interface may be provided for an operator to select the accounts that fail compliance and for flagging accounts that fail compliance.

The training set flagging module 112 further determines a plurality of fail parameters 115 based on the user accounts 28 that fail compliance and the user accounts that meet compliance in the training set 114. By way of example, the fail parameters may be the factors that have been identified with reference to FIG. 3 above. The fail parameters 115 may also be weighted differently depending on their importance. The fail parameters 115 are used to create reference data

116. The training system 18 enters the reference data 116 into the compliance score model 34.

Figure 7B:
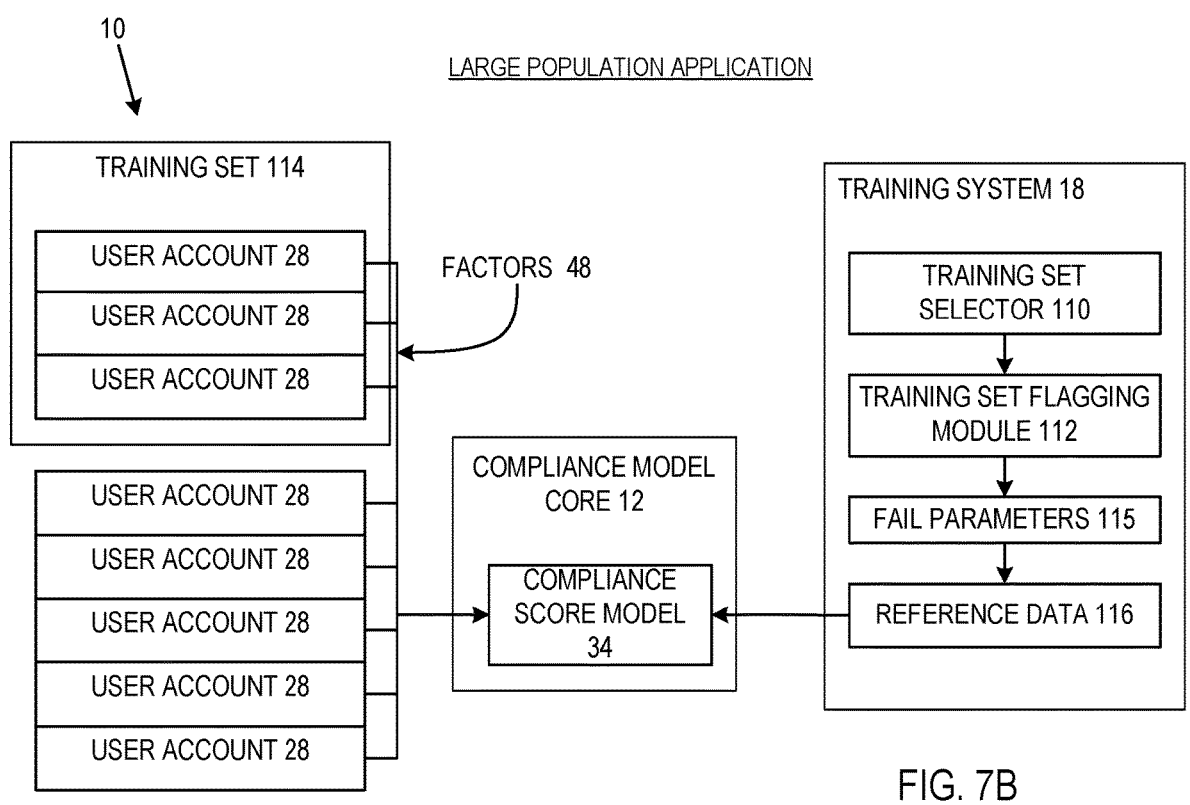

FIG. 7B illustrates large population application of the small sample based training of FIG. 7A. The compliance score model 34 receives factors 48 from all the user accounts 28 that form part of the training set 114 and do not form part of the training set 114. The compliance score model 34 then determines a compliance score of each one of the accounts 28. The compliance score model 34 uses the reference data 116 provided by the training system 18 in order to determine a compliance score for each one of the user accounts 28 forming part of the training set 114 and the user accounts 28 not forming part of the training set 114.

Small sample based training has the benefit of developing reference data 116 relatively quickly for the compliance score model 34. To the extent that an operator is involved, the operator only has to go through a small number of user accounts for purposes of the training. Even though a small number of accounts are analyzed during the initial training, the reference data 116 is still applicable to all the user accounts for purposes of determining their compliance scores.

Figure 8:
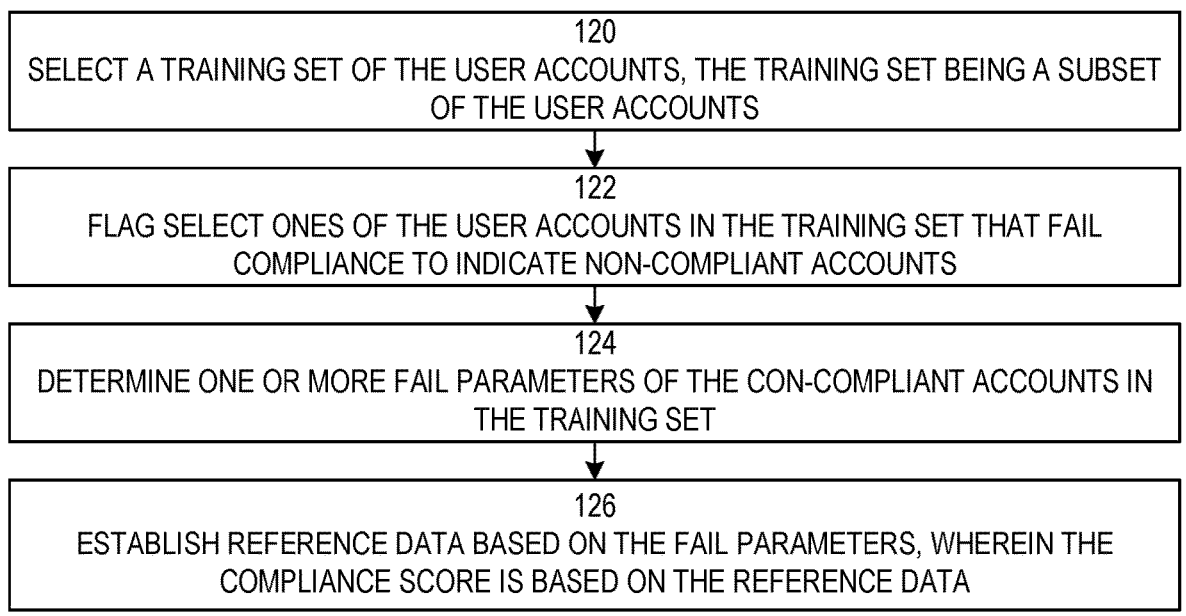
FIG. 8 is a flow chart illustrating small sample based training and large population application.

FIG. 8 illustrates a method of small sample based training and large population application as it relates to compliance determination and enforcement. At 120, a training set of user accounts is selected. The training set is a subset of the user accounts. At 122, flags are set for select ones of the user accounts in the training set that fail compliance to indicate non-compliant accounts. At 124, one or more failed parameters are determined of the non-compliant accounts in the training set. At 126, reference data is established based on the failed parameters. The compliance score (see FIG. 5:80) is based on the reference data.

Figure 9:
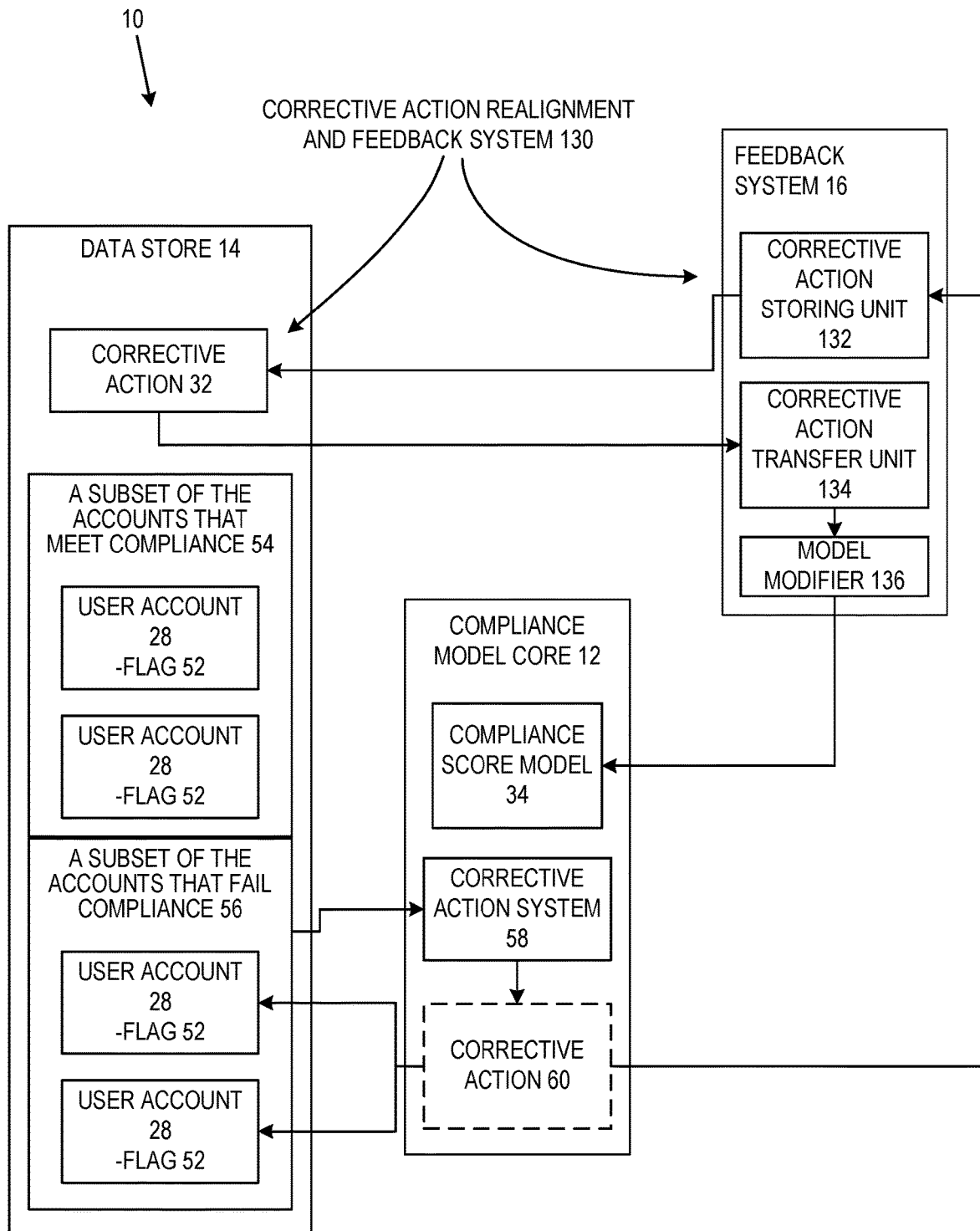
FIG. 9 is a block diagram of the compliance determination and enforcement platform specifically illustrating a corrective action realignment and feedback system.

FIG. 9 illustrates a corrective action and realignment and feedback system 130 that is integrated into the compliance determination and enforcement platform 10.

As previously mentioned, the compliance model core 12 includes a corrective action system 58 that takes corrective action 60. The feedback system 16 includes a corrective action storing unit 132 that is connected to the compliance model core 12. The corrective action storing unit 132 stores the corrective action 60 from the compliance model core 12 in the data store 14 as the corrective action 32.

The feedback system 16 further includes a corrective action transfer unit 134 connected to the data store 14, and a model modifier 136 connected to the corrective action transfer unit 134. The corrective action transfer unit 134 retrieves the corrective action 32 from the data store 14. The corrective action transfer unit 134 then enters the corrective action 32 retrieved from the data store 14 to the model modifier 136. The model modifier 136 then modifies the compliance score model 34 based on the corrective action 32.

The compliance score model 34 may previously have flagged an account as non-compliant. After further investigation using the corrective action system 58, an investigator may make the determination that the account is compliant. The corrective action 60 will include that the account is compliant and the account will not be closed. The corrective action storing unit 132 will store the corrective action 32 in the data store 14 indicating that the account is compliant. The corrective action transfer unit 134 transfers the corrective action 32 to the model modifier 136 so that the model modifier 136 is informed of the account that has been determined to be compliant. The model modifier 136 modifies the compliance score model 34 so that the compliance score model 34, in future calculations, will determine that the account is compliant. Further accounts that may previously have been flagged because they have compliance scores that are non-compliant will, in future, be flagged as having compliance scores that are compliant by the compliance score model 34.

The compliance score model 34 is thus continuously updated with a feedback system 16 that is based on a human sanity check from the corrective action system 58. The functioning of the compliance score model 34 is continuously improved in this manner.

Figure 10:
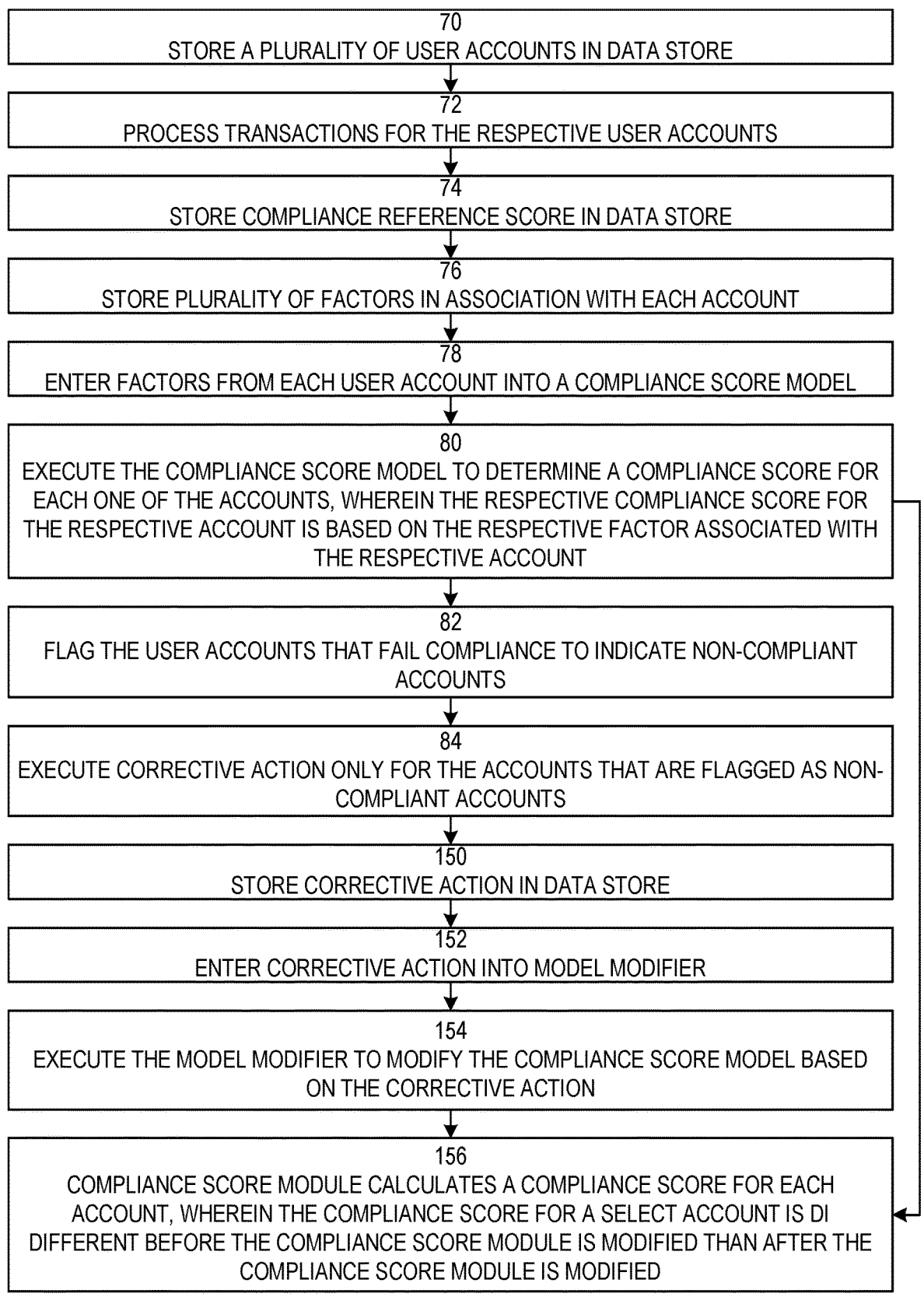
FIG. 10 is a flow chart illustrating compliance determination and enforcement with corrective action realignment and feedback.

FIG. 10 illustrates a method of corrective action realignment and feedback as part of the compliance determination and enforcement method. Step 70 to 84 have been described with reference to FIG. 5. At 150, the corrective action is stored in the data store. At 152, the corrective action is entered into the model modifier. At 154, the model modifier is executed to modify the compliance score model based on the corrective action. At 156, the compliance score module calculates a compliance score for each account. The compliance score for a select account is different before the compliance score module is modified than after the compliance score module is modified.

Figure 11:
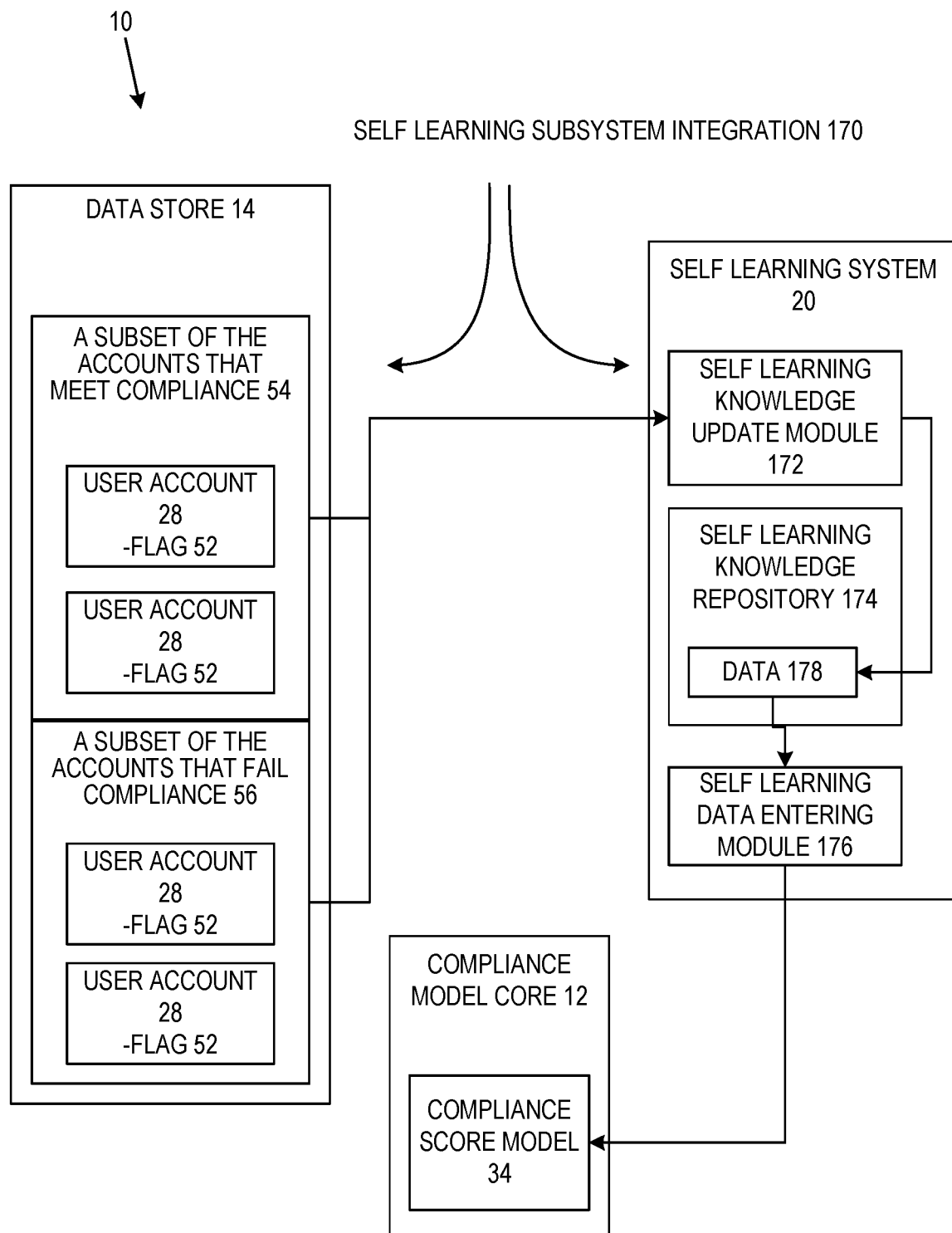
FIG. 11 is a block diagram of the compliance determination and enforcement platform illustrating self learning subsystem integration.

FIG. 11 shows self learning subsystem integration 170 within the compliance determination and enforcement platform 10.

The self learning system 20 includes a self learning knowledge update module 172 that is connected to the user accounts 28 in the data store 14, a self learning knowledge repository 174, and a self learning data entering module 176. The self learning knowledge update module 172 and the self learning data entering module 176 are automatically executed sequentially after one another. The self learning knowledge repository 174 had data 178 stored therein. The self learning knowledge update module 172 continually retrieves data from the user accounts 28. The self learning knowledge update module 172 continually assess weight factors to apply to various data in the user accounts 28 for purposes of compliance scoring. The self learning knowledge update module 172 provides the data together with their relative weight factors to the self learning knowledge repository 174, which stores the data as the data 178. The data 178 is thus continually updated by the self learning knowledge update module 172. The data 178 may for example be updated every week or every month.

As soon as the data 178 has been updated, the self learning data entering module 176 enters the data 178 into the compliance score model 34. When the compliance score model 34 determines a compliance score for a respective user account as described with reference to FIG. 3, the compliance score model 34 bases the compliance score on the data received from the self learning data entering module 176.

Figure 12:
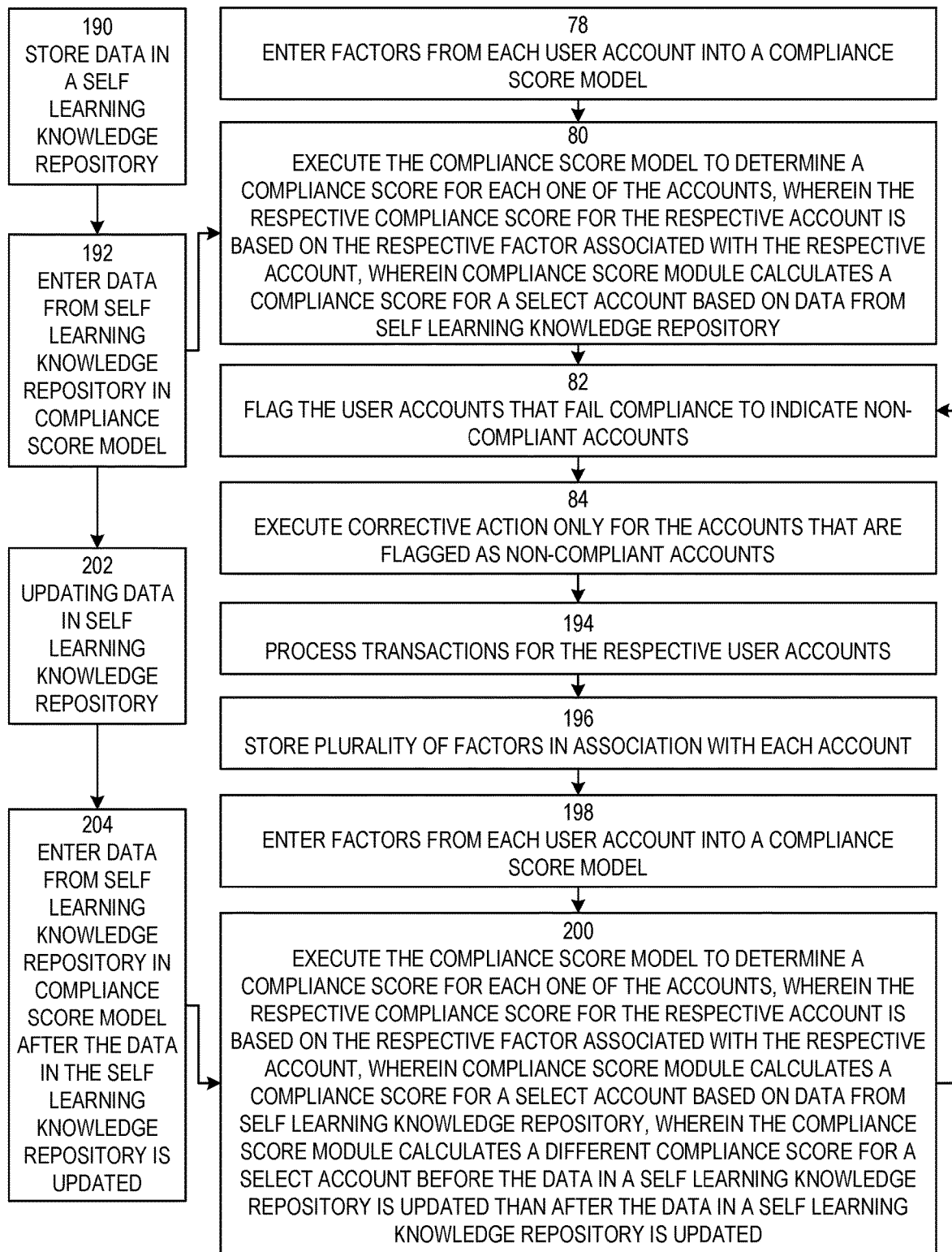
FIG. 12 is a flow chart illustrating a compliance determination and enforcement method with integrated self learning.

FIG. 12 illustrates a self learning method forming part of the compliance determination and enforcement method. Steps 78 to 84 have been described with reference to FIG. 5. At 190, data is stored in the self learning knowledge repository. At 192, the data is entered from the self learning knowledge repository into the compliance score model. When the compliance score model executes at 80, the compliance score model bases the respective compliance scores for the respective accounts on the data that is entered at 192.

At 194, further transactions are processed for the respective user accounts. At 196, a plurality of factors are stored in association with each account. The factors that are stored in association with each account may be partially updated factors that have been stored as described with reference to FIG. 3. At 198, the factors from the user accounts are entered into the compliance score model as described with reference to FIG. 3. At 200, the compliance score model executes to determine a compliance score for each one of the accounts. The respective compliance score for the respective account is based on the respective factors associated with the respective account.

At 202, the data in the self learning knowledge repository is updated. At 204, the data from the self learning knowledge repository is entered into the compliance score model after the data in the self learning knowledge repository is updated. When the compliance score model executes at 200, the compliance score module calculates a compliance score for a select account based on data from the self learning knowledge repository. The compliance score module calculates a different compliance score for a select account before the data in the self learning knowledge repository is updated (i.e., at 80) than after the data in the self learning knowledge repository is updated (i.e., at 202).

Following the execution of the compliance score model at 200, the process re-enters at 82 to flag user accounts that fail compliance. Following 204, the process re-enters at 200 to again update data in the self learning knowledge repository.

By continually updating the knowledge in the self learning knowledge repository, the functioning of the compliance score model can be improved over time. Factors can be added or deleted depending on their relevance for purposes of providing a compliance score. Factors that are relevant for a compliance can be weighted differently over time to improve the functioning of the compliance score model and improve the relevance of compliance scores.

Figure 13:
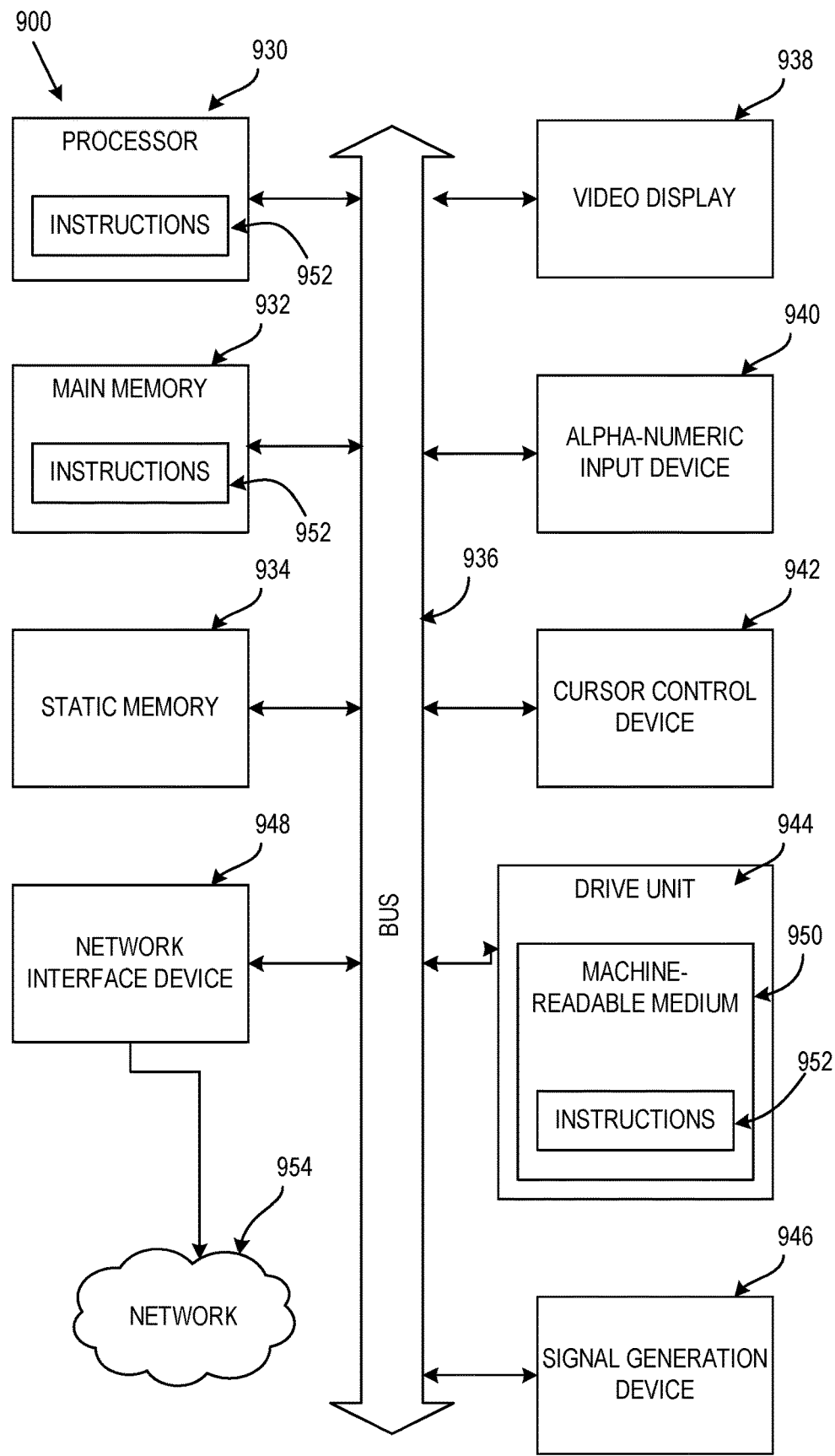
FIG. 13 is a block diagram of a machine in the form of a computer system forming part of the compliance determination and enforcement platform.

FIG. 13 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A compliance determination and enforcement platform comprising:
    a processor;
    a computer-readable medium connected to the processor; and
    a set of computer readable code on the computer-readable medium, including:
        a data store;
        a plurality of user accounts stored in the data store;
        a transaction processor that is executable by the processor to process transactions for the respective user accounts;
        a compliance reference score stored in the data store;
        a plurality of factors stored in association with each account;
        a trained compliance score model that is trained by factors generated by the transaction processor;
        a factor entering module that is executable by the processor to enter at least one factor from each user account into the trained compliance score model, wherein the compliance score model is executable by the processor to determine a compliance score for each one of the accounts, wherein the respective compliance score for the respective account is based on the respective at least one factor associated with the respective account;
        a comparator that is executable by the processor to compare the compliance score for each account with the compliance reference score to determine a subset of the accounts that fail compliance and a subset of the accounts that meet compliance;
        a flagging unit that is executable by the processor to flag the user accounts that fail compliance to indicate non-compliant accounts;
        a corrective action system that is executable by the processor to perform a corrective action only for the accounts that are flagged as non-compliant accounts, and to provide a user interface that displays a compliance score for at least one of the plurality of accounts and receives user input identifying a selected flagged account as one of a bad account and a good account based on selection of an action, wherein the corrective action system is constructed to:
            in response to receiving user input identifying a flagged account as bad, enter information identifying the account as bad and the corrective action into a feedback system and closing the account, and in response to receiving user input identifying a flagged account as good, enter information identifying the account as good into the feedback system without closing the account; and a model modifier unit that is executable by the processor to modify, automatically and without human input, the compliance score model according to the information entered into the feedback system.

2. The compliance determination and enforcement platform of claim 1, wherein at least one of the factors entered into the compliance score model is an age of a user of the respective account.

3. The compliance determination and enforcement platform of claim 1, wherein at least one of the factors entered into the compliance score model is a level of due diligence that has been performed on the respective account.

4. The compliance determination and enforcement platform of claim 1, wherein at least one of the factors entered into the compliance score model is a balance of the respective account.

5. The compliance determination and enforcement platform of claim 1, wherein at least one of the factors entered into the compliance score model is a volume of transactions of the respective account.

6. The compliance determination and enforcement platform of claim 1, wherein at least one of the factors entered into the compliance score model is a geographical location of a user of the respective account.

7. The compliance determination and enforcement platform of claim 1, wherein at least one of the factors entered into the compliance score model is a number of devices used to access the respective account.

8. The compliance determination and enforcement platform of claim 1, wherein at least one of the factors entered into the compliance score model is one or more previous compliance reviews of the respective user account.

9. The compliance determination and enforcement platform of claim 1, wherein at least one of the factors entered into the compliance score model is a based on if and how a user of the respective account has verified their identity.

10. The compliance determination and enforcement platform of claim 1, wherein at least one of the factors entered into the compliance score model is based on the transaction for the largest amount among the transactions of the respective account.

11. The compliance determination and enforcement platform of claim 1, wherein at least one of the factors entered into the compliance score model is based on how many changes have been made to personal details of the respective account.

12. The compliance determination and enforcement platform of claim 1, wherein the corrective action system allows for:
    determining, whether a transaction in the account is for more than a predetermined reporting amount; and
    only if the transaction is for more than the predetermined reporting amount, then filing a report.

13. The compliance determination and enforcement platform of claim 1, further comprising:
    a training set selector operable to select a training set of the user accounts, the training set being a subset of the user accounts;
    a training set flagging module operable to flag select ones of the user accounts in the training set that fail compliance to indicate non-compliant accounts to determine at least one fail parameter of the non-compliant accounts in the training set; and
    reference data established based on the fail parameters, wherein the compliance score is based on the reference data.

14. The compliance determination and enforcement platform of claim 1, wherein a plurality of factors from each account are entered into the compliance score model and the respective compliance score for the respective account is based on the respective plurality of factors associated with the respective account.

15. The compliance determination and enforcement platform of claim 1, further comprising:
    a corrective action storing unit storing the corrective action in the data store; and
    a corrective action transfer unit entering the corrective action into the model modifier unit.

16. The compliance determination and enforcement platform of claim 1, further comprising:
    a self learning knowledge repository;
    data stored in the self learning knowledge repository;
    a self learning data entering module entering the data from the self learning knowledge repository in the compliance score model, wherein the compliance score module calculates a compliance score for a select account based on the data from the self learning knowledge repository; and
    a self learning knowledge update module updating the data in the self learning knowledge repository, wherein the self learning data entering module enters the data from the self learning knowledge repository in the compliance score model after the data in the self learning knowledge repository is updated, wherein the compliance score module calculates a different compliance score for a select account before the data in the self learning knowledge repository is updated than after the data in the self learning knowledge repository is updated.

17. A compliance determination and enforcement method, comprising:
    storing, by at least one processor, a plurality of user accounts in a data store;
    processing, by the at least one processor, transactions for the respective user accounts;
    storing, by the at least one processor, a compliance reference score in the data store;
    storing, by the at least one processor, a plurality of factors in association with each account;
    entering, by the at least one processor, at least one factor from each user account into a trained compliance score model;
    executing, by the at least one processor, the compliance score model to determine a compliance score for each one of the accounts, wherein the respective compliance score for the respective account is based on the at least one factor associated with the respective account;
    comparing, by the at least one processor, the compliance score for each account with the compliance reference score to determine a subset of the accounts that fail compliance and a subset of the accounts that meet compliance;
    flagging, by the at least one processor, the user accounts that fail compliance to indicate non-compliant accounts;

executing, by the at least one processor, a corrective action only for the accounts that are flagged as non-compliant accounts;

receiving, by the at least one processor, user input identifying a selected flagged account as one of a bad account and a good account based on selection of an action, wherein the user input is received via a user interface that displays a compliance score for at least one of the plurality of accounts;

in response to receiving user input that identifies the selected flagged account as a bad account, entering, by the at least one processor, information identifying the account as bad and the corrective action into a feedback system and closing the account;

in response to receiving user input that identifies the selected flagged account as a good account, entering, by the at least one processor, information identifying the account as good into the feedback system without closing the account; and modifying, by the at least one processor automatically and without human input, the compliance score model according to the information entered into the feedback system.

\* \* \* \* \*